April 1, 1969     W. B. BURKETT ET AL     3,436,639
VOLTAGE CUT-OFF CIRCUITS

Filed March 6, 1967     Sheet 1 of 4

INVENTORS.
WILFORD B. BURKETT
ROBERT V. JACKSON
BY
Christie, Parker & Hale
ATTORNEYS

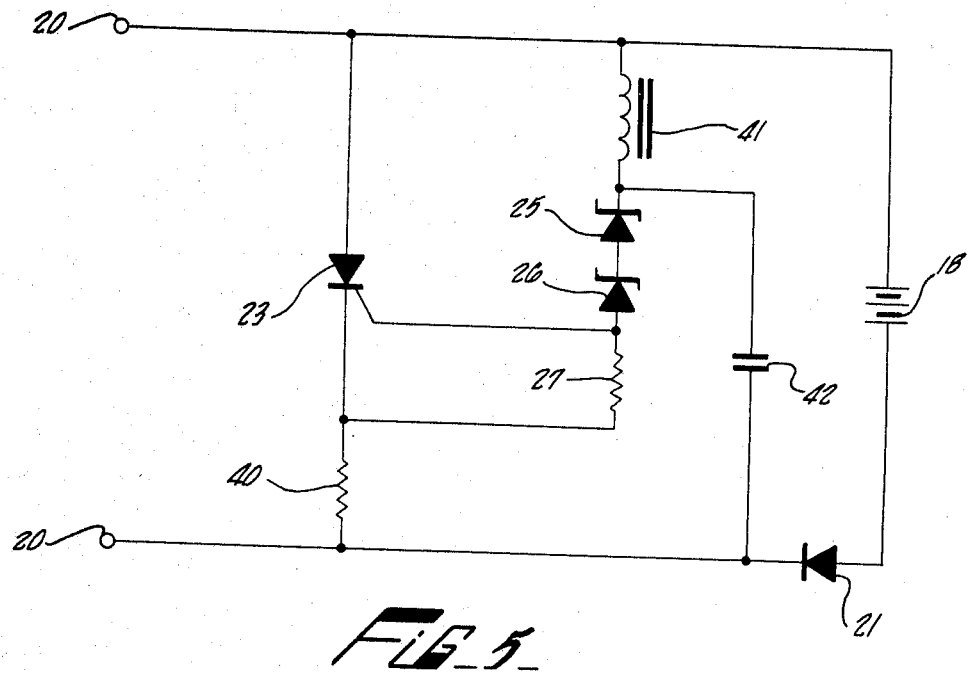
F!G_5_
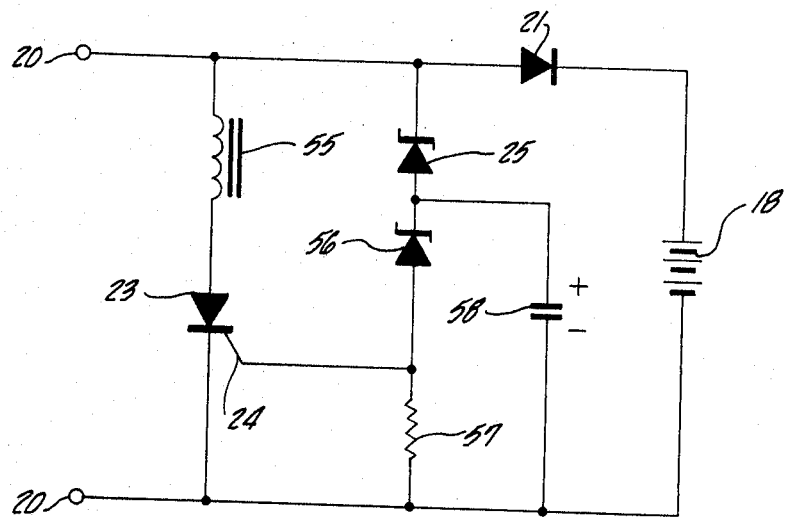
F!G_6_

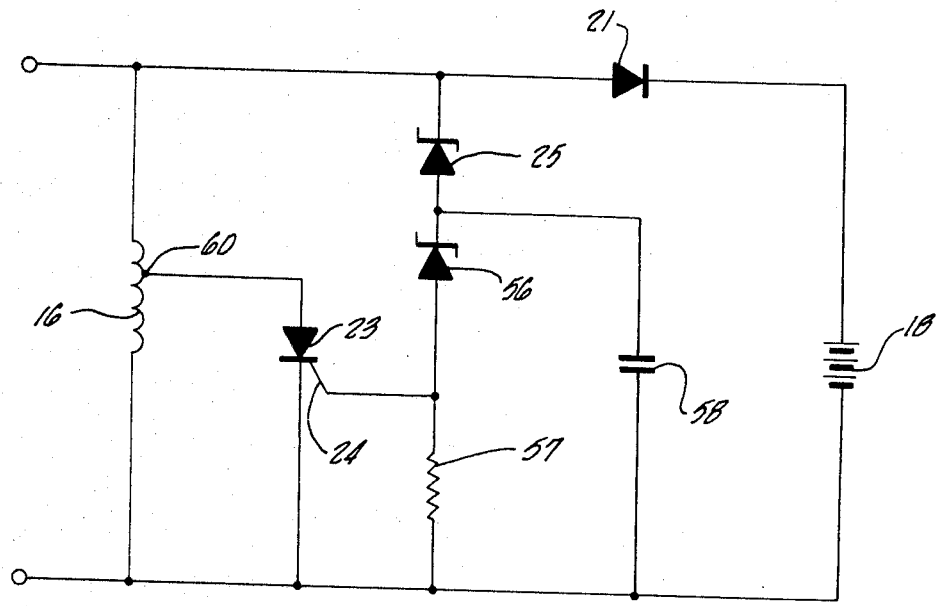
_Fig_7_
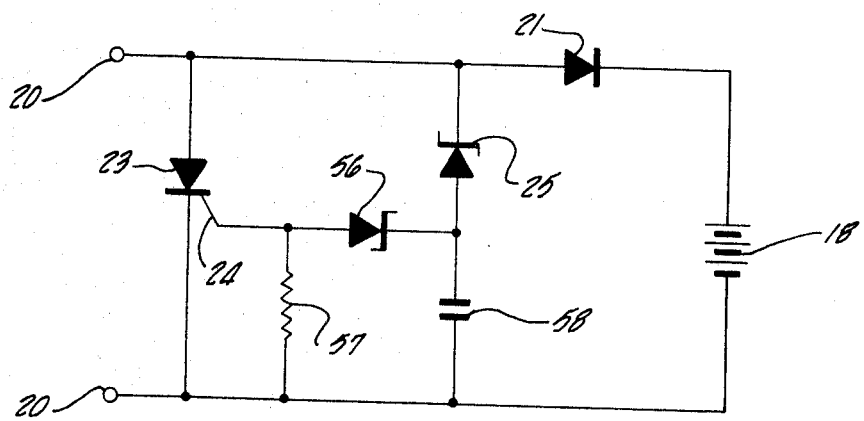
_Fig_8_

United States Patent Office

3,436,639
Patented Apr. 1, 1969

3,436,639
VOLTAGE CUT-OFF CIRCUITS
Wilford B. Burkett, Pacific Palisades, and Robert V. Jackson, Los Angeles, Calif., assignors to McCulloch Corporation, Los Angeles, Calif., a corporation of Wisconsin
Continuation-in-part of application Ser. No. 530,129, Feb. 25, 1966. This application Mar. 6, 1967, Ser. No. 621,014
Int. Cl. H02j 7/10
U.S. Cl. 320—27                3 Claims

ABSTRACT OF THE DISCLOSURE

A voltage responsive cut-off circuit cuts off the charging current supplied to a battery by a variable direct-current source when the terminal voltage of the battery reaches a preselected value. The cut-off circuit is voltage-responsive and includes circuitry for limiting the current flow therethrough to prevent burning out the elements and further includes circuitry for bypassing the transient voltages so that the cut-off circuit will be responsive to the true direct-current voltage level across the battery.

CROSS-REFERENCE TO RELATED APPLICATION

This application is a continuation-in-part of our earlier application Ser. No. 530,129, filed Feb. 25, 1966.

BACKGROUND OF THE INVENTION

Field of the invention

This invention relates generally to voltage-responsive circuits, and more particularly relates to an electronic circuit for cutting off the charging current between a variable, direct-current voltage source and a battery.

The voltage-responsive circuit of the present invention is particularly designed to cut off the charging current which charges a battery of secondary cells from a DC (direct-current) generator driven by an internal combustion engine with a widely varying speed. For example, the circuit of the present invention is particularly designed for use in connection with a chain saw driven by a single cylinder, two-cycle, internal combustion engine. An electric generator having series and shunt field windings may be mechanically coupled to the engine and may be utilized as the starter for the engine. The battery in turn consists of a plurality of secondary cells such as nickel-cadmium cells that are rechargeable. Thus, by driving the DC motor from the battery, the engine can be started. After the engine has been started, the battery must be recharged. To this end the generator may be directly driven by the engine to supply charging current to the battery.

However, the charging voltage must be closely controlled to avoid damage to the secondary batteries. To this end it may be assumed that the voltage across the battery is an indication of the state of charge of the battery.

Chain saws driven by a single cylinder, two-cycle, internal combustion engine are subject to a large amount of vibration. This vibration affects the generator that is being driven by the engine and causes brush bounce at the commutator. This brush bounce creates an undesirable high voltage transient on the output voltage of the generator.

This condition also exists in other tools that have an electric starter and a battery thereof that is recharged by a generator driven by the engine of the tool. For example, there is a similar transient voltage creating vibration in power lawn care equipment and power snow removal equipment.

This transient voltage can cause a false indication of the condition of the battery that is being charged, with a resultant premature removal of the charging current. It can also cause a surge current through the control circuits with the possibility of damage to the elements in the control circuits.

SUMMARY OF THE INVENTION

In accordance with the present invention there is provided a voltage-responsive circuit for cutting off the charging current between a variable voltage source, such as a DC generator, and a battery. The generator is subject to being driven at widely varying speeds and includes a shunt field winding. A rectifier is connected in series with the battery, the rectifier being so poled as to permit charging of the battery when the voltage across the generator exceeds the battery voltage. There is further provided a switch such, for example, as a silicon controlled rectifier, which is connected across the shunt winding of the generator.

This switch is adapted to short-circuit the shunt winding when triggered. The triggering is effected by control circuit means coupled to the switch and responsive to the voltage across the battery. This circuit means may consist of a voltage divider which may, for example, include a Zener or breakdown diode.

Additionally, in accordance with the present invention, a current limiting means is connected in the current path of the element that short circuits the shunt winding in order to reduce current surges therethrough.

Further, the voltage-responsive control circuit includes a means for filtering out the transient voltages so that the circuit will be responsive only to the true direct-current voltage level across the battery.

BRIEF DESCRIPTION OF THE DRAWING

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 5 is a schematic circuit diagram of a preferred voltage-responsive circuit having a current limiting element and a transient voltage filtering circuit in accordance with the present invention; and FIGS. 6–8 are circuit diagrams of other embodiments of the voltage-responsive cut-off circuits of the present invention.

DESCRIPTION OF THE PREFERRED EMBODIMENTS

Figure 1:
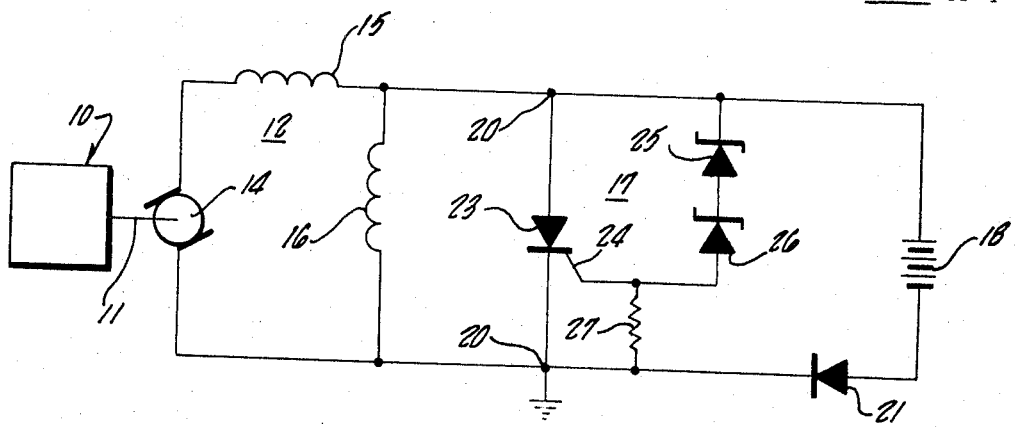
FIG. 1 is a circuit diagram of a circuit for charging a battery from a direct-current generator.

Referring now to the drawings, wherein like elements are designated by the same reference characters, in FIG. 1 there is illustrated a prime mover generally indicated at 10 such, for example, as an internal combustion engine. As previously pointed out, the circuit of the present invention for controlling the charging of a battery from a generator is particularly designed for use with a chain saw driven by a single cylinder, two-cycle, internal combustion engine. However, in general, it will be understood that the circuit of the invention is particularly applicable for all types of internal combustion engines where the engine speed varies over a wide range and the engine subjects the generator to vibrations with resultant brush bounce and generation of high voltage transients. Examples of such engines are outboard boat engines, engines for automotive vehicles as well as other engines used for portable or transportable power tools and even for stationary applications.

The prime mover 10 is preferably directly connected such as by a drive shaft 11 to a DC generator generally indicated at 12. The DC generator has an armature 14 including the conventional armature windings, a series field winding 15 and a shunt field winding 16. It should be noted, as shown in FIG. 1, that the series winding 15 and the shunt winding 16 are connected in a closed loop with the armature 14.

An electronic circuit 17 is connected between the generator 12 and a battery 18 consisting of secondary cells. Hence, the circuit 17 is connected between the output terminals 20 of the generator, one of which may be grounded as shown, and the battery 18. Connected in series with the output terminals 20 and the battery 18 there is a rectifier or diode 21. As shown in FIG. 1, the diode 21 has its cathode connected to ground. However, the rectifier 21 may also be connected between battery 18 and series field winding 15. The rectifier 21 is preferably a semiconductor diode but not necessarily so. It is so poled as to block current flow from the battery 18. Charging current to the battery occurs when the voltage of the generator 12 developed across the output terminals 20 exceeds a predetermined value. This is determined by the voltage across the battery 18 and the forward voltage drop across the diode 21.

Connected across the battery 18 and the diode 21 there is a multilayer diode 23 commonly known as a silicon controlled rectifier which may, for example, consist of an NPNP four-layer diode and operates as an electronic switch. This type of rectifier is provided with a gate or control electrode 24. The silicon controlled rectifier 23 is normally non-conductive. However, it does become conductive when a voltage of a given polarity and magnitude is applied across the device 23 and provided a voltage signal of predetermined magnitude is applied to its control electrode 24. In order to do this, there is provided a voltage divider circuit across the battery 18 and diode 21. This consists of two Zener diodes 25 and 26 connected in series and a resistor 27, their junction point being connected to the control electrode 24.

A Zener diode is also known as a breakdown diode and has such characteristics that it permits a current flow in a reverse direction through the diode only when the voltage across the diode exceeds a predetermined value. At that voltage the diode breaks down and begins to conduct. Obviously, one of the Zener diodes such as diode 26 may be omitted.

The operation of the voltage cut-off circuit will now be explained. It is assumed the battery 18 is discharged from time to time. For example, its function may be to drive the generator 12 which may operate as an electric motor for starting the prime mover 10. To this end, of course, there must be a switch bypassing the diode 21. However, as far as the present invention is concerned all that is necessary is that the battery 18 has previously been discharged.

When the prime mover 10 driving the generator 12 reaches a certain speed, an output voltage is developed across the generator output terminals 20. Accordingly, when the output voltage developed at the generator output terminals 20 exceeds the forward voltage drop of diode 21 and the battery voltage, a charging current flows through the battery 18. As a general rule and as an approximation, the battery voltage indicates the state of charge for any secondary cell battery. As a result the battery voltage increases as the percentage of the charge increases. Thus, the forward voltage drop of the diode 21 may, for example, be 0.6 volt. It may further be assumed that the battery 18 consists of ten secondary cells each rated at 1.25 volts so that the nominal voltage across the battery 18 is 12.5 volts and may be as high as 15 volts.

Accordingly, assuming the flow of a charging current, the battery voltage increases and the generator output voltage also rises. This generator output voltage appears across the two Zener diodes 25, 26 and the resistor 27. The two Zener diodes 25, 26 are so selected that they conduct current in response to a predetermined voltage thereacross. Thus, when the voltage across the generator output terminals 20 reaches a certain value, the two Zener diodes 25, 26 will conduct and there will be a voltage drop across the resistor 27. This voltage drop appears at the control electrode 24. Assuming that this voltage is sufficiently high, it will trigger the silicon controlled rectifier 23 which subsequently becomes conductive.

This now short-circuits the shunt winding 16 and bypasses the field current of the generator. As a result, the generator loses excitation and the output voltage of the generator decreases to a small value. This small output voltage is sustained by the residual magnetism or remanence of the magnetic circuit of the generator.

Figure 2:
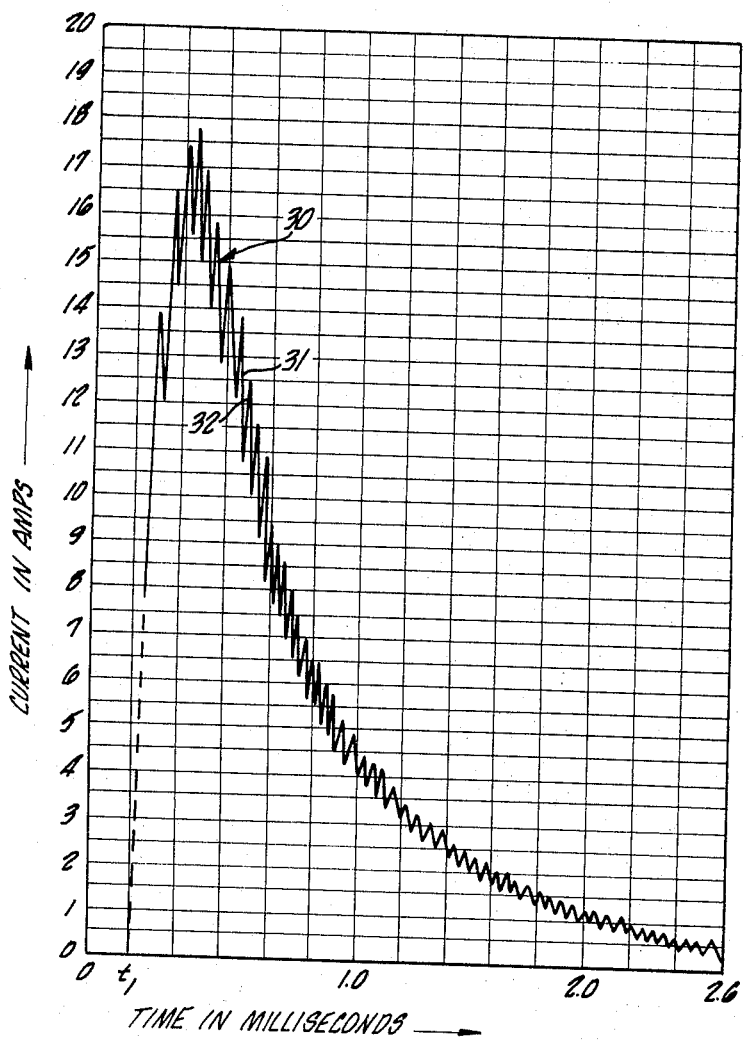
FIG. 2 is a graph plotting the current as a function of time and showing the current through the switching means included in the circuit of FIG. 1.

Referring now to FIG. 2 there is illustrated a curve showing the current in amperes flowing through silicon controlled rectifier 23 as a function of time in milliseconds after the voltage of battery 18 has reached a selected value that indicates the desired charge. The battery charges between time 0 and $t_1$ shown on the graph of FIG. 2. At time $t_1$ the silicon controlled rectifier breaks down and begins to conduct. The curve of FIG. 2 shows that the current through the silicon controlled rectifier 23 quickly reaches a peak value, then decays in a generally exponential fashion when the silicon controlled rectifier becomes conductive.

It will be noted that the curve 30 consists of a multitude of individual falling curve portions such as 31 and rising curve portions such as 32. These are caused by the shape of the commutator of the generator and the speed of the generator. However, in any case, it is apparent that the current very rapidly decays within a matter of a few milliseconds.

Figure 3:
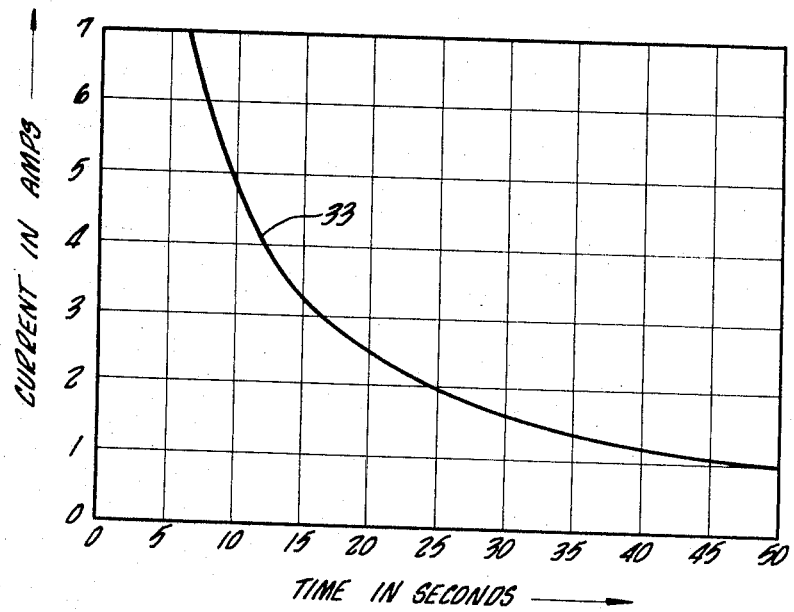
FIG. 3 is a graph showing the charging current as a function of time required to recharge the battery after a typical starting discharge.

Referring now to FIG. 3 there is illustrated a curve 33 showing the maximum permissible charging current in amperes as a function of time in seconds. Thus, any charging current for a given nickel-cadmium cell below curve 33 is safe while any current above or to the right of curve 33 is unsafe. This curve clearly shows that such nickel-cadmium secondary cells will stand a very high charging current for a short period but can only accept a relatively low charging current for any extended period of time. In accordance with the present invention use is made of this curve because the battery is charged very rapidly with a large current but for a short period of time. As a result, the battery is again ready to be used, for example, for driving the generator 12 as a motor to start the gasoline engine 10.

Figure 4:
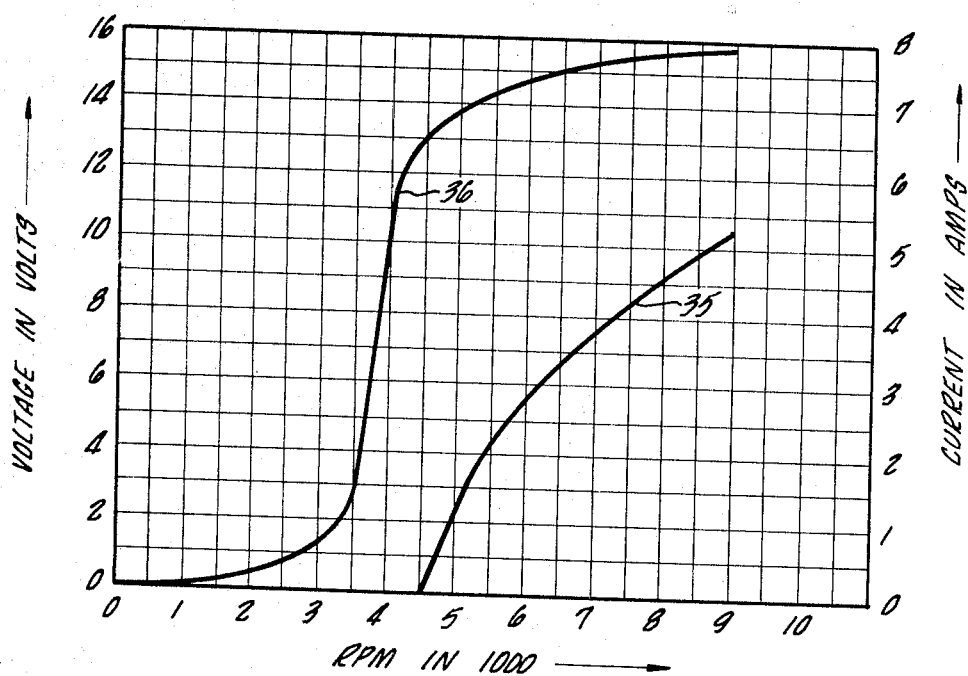
FIG. 4 is another graph showing the voltage as well as the current as a function of the number of revolutions of the engine driving the generator and indicating the characteristics of the generator output voltage and charging current.

FIG. 4 depicts both the generator output voltage across terminals 20 and the battery charging current as a function of the number of revolutions (r.p.m.) of the gasoline engine 10. Thus, the r.p.m. are shown in units of thousands in FIG. 4. The battery charging current is shown by curve 35 while curve 36 indicates the generator output voltage. It will be noted that the output voltage rises rapidly as the engine speed exceeds approximately 3,500 r.p.m. Below that value there is no charging current because the generator output voltage must exceed a certain value as pointed out before, such as about 13 volts before the charging current can flow through the diode 21.

It will thus be apparent that the cut-off circuit operates in essence as voltage limiter. It is triggered when the battery voltage exceeds a certain value and, hence, is sensitive to voltage. Thus, it will not permit the generator output voltage to rise above a certain value which would ruin the battery.

As long as the generator is driven above a certain speed, say about 4000 to 5000 r.p.m., the residual magnetism in the yoke and in the field poles of the generator will be sufficient to maintain the silicon controlled rectifier 23 coductive.

It has been found that, particularly at high speeds of the prime mover 10, the brushes of the direct-current generator 12 may bounce. This causes ripples or transient voltages to appear at the output of the generator.

Since the cut-off circuit 17 is responisve to the voltage across the battery which is also the voltage at the output of the generator 12, the circuit may respond to a high voltage transient rather than the true direct-current level across the battery, and cut off the charging current prematurely.

Additionally, the presence of the brush bounce and the resultant voltage transients may cause surges of current to flow through the switch or silicon controlled rectifier 23. These surge currents may break down or burn out the silicon controlled rectifier.

The cut-off circuit is made responsive to the true direct-current level across the battery and the switch is protected from excessive current in accordance with the present invention, a diagram of a preferred circuit being shown in FIG. 5. The switch of the voltage-responsive cut-off circuit is shown as a silicon controlled rectifier 23 in FIG. 5. However, it is to be understood other types of switches may be employed that are responsive to an external signal and which will close the shunt path around the shunt winding 16 of the generator to effectively short-circuit the generator and reduce the output voltage below that required to charge the battery 18.

The silicon controlled rectifier 23 is protected from surge currents by a current limiting device shown as a resistor 40 connected in series with the silicon controlled rectifier 23. Thus, the resistor 40 will protect the switch or silicon controlled rectifier 23 from damage by excessive currents that may be produced because of the transient voltages that result from the brush bounce caused by vibrations of the generator 12.

Additionally, the circuit of FIG. 5 includes means for bypassing the transient voltages around the voltage-responsive circuit of the Zener diodes 25, 26 and resistor 27 so that only the true direct-current voltage value appears across the voltage-responsive circuit. The bypassing means or filtering means includes an inductor 41 and capacitor 42 connected in series directly across the output terminals 20 of the generator 12. Any high frequencies or transient voltages will be opposed by the inductor 41 and bypassed around the Zener diodes 25 and 26 and the resistor 40 by capacitor 42.

An alternative embodiment of the filtering means in accordance with the present invention is shown in FIG. 6. In the circuit of FIG. 6 an inductor 55 has been connected in series with the silicon controlled rectifier 23 across the input terminals 20. The voltage divider circuit includes a first Zener diode 25 connected in series with a second Zener diode 56 and a resistor 57. The junction point between the Zener diode 56 and the resistor 57 is connected to the gate electrode 24 of the controlled rectifier 23.

Furthermore, a capacitor 58 may be connected between the junction point of the two Zener diodes 25 and 56, on the one hand, and one of the terminals 20 on the other hand.

The capacitor 58 operates in conjunction with the remainder of the circuit as a filter or smoothing circuit. The voltage peaks which may appear due to the skipping of the brush of the generator are filtered out above a predetermined voltage which is the breakdown voltage of the Zener diode 25. The excess voltage is absorbed by the capacitor 58.

Thus, the capacitor 58 discharges when the Zener diode 56 breaks down. This discharge takes place through the remainder of the trigger circuit, that is, through the parallel combination of resistor 57 and controlled rectifier 23 and the diode 56. On the other hand, the capacitor 58 is charged when the breakdown voltage of Zener diode 25 is exceeded so that the Zener diode conducts current. When the capacitor 58 discharges a voltage pulse is delivered to the gate electrode 24 of the silicon controlled rectifier 23 which positively insures conduction of the controlled rectifier.

It will be understood that the capacitor 58 may be omitted from the circuit of FIG. 6. In that case the inductor 55 can still be used to provide an inductance-resistance circuit represented by the inductance of inductor 55 and the resistance of controlled rectifier 23 and the remainder of the circuit as seen looking into the rectifier 23, to provide a time constant or smoothing circuit. The inductor 55 will oppose any rapid changes in the current through the silicon controlled rectifier 23 and will thus have a smoothing and limiting effect.

The circuit of FIG. 7 is similar to that of FIG. 6 but does not require a separate inductor 55. Thus, as shown in FIG. 7, the shunt field winding 16 is provided with an intermediate tap 60 which is connected to one terminal of the silicon controlled rectifier 23. Thus, a portion of the inductance of the shunt winding 16 is in series with the controlled rectifier 23 to apply a portion of the back electromotive force of the field winding to the controlled rectifier. The remainder of the circuit of FIG. 7 is the same as that of FIG. 6 and its operation does not require further explanation.

The circuit of FIG. 8 to which reference is now made, is similar to that of FIG. 6 but does not include the inductor 55, nor is the silicon controlled rectifier 23 connected in series with a portion of the field winding 16 as shown in FIG. 7. However, the circuit of FIG. 8 does include the capacitor 58, the function and purpose of which has been previously described.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described merely by way of example and we do not wish to be restricted to the specific form shown or uses mentioned except as defined in the accompanying claims, wherein various portions have been separated for clarity of reading and not for emphasis.

What is claimed is:

1. A filtered voltage responsive cut-off circuit for cutting off the charging curent to a battery from a direct-current generator having a shunt field winding and subject to being driven at widely varying speeds, said battery including at least one secondary cell connected across the output terminals of said generator and the shunt field winding through a rectifier poled to permit charging the battery when the voltage across the generator exceeds the battery voltage, said circuit comprising a silicon controlled rectifier with the anode thereof connected to the positive output termial of said generator and the cathode thereof connected to the negative output terminal of said generator, a transient voltage filter having an inductor and capacitor connected in series with the series connection being connected across the output terminals of said generator with the inductor connected to the positive output terminal and the capacitor connected to the negative output terminal, and a voltage responsive triggering circuit having at least one Zener diode connected in series with a resistor with the triggering circuit being connected between the junction of the inductor and capacitor and the negative output terminal of said generator with the resistor being connected to the negative output terminal, and means for connecting the control electrode of said silicon controlled rectifier to the junction of the Zener diode and the resistor in the triggering circuit.

2. A filtered voltage responsive cut-off circuit in accordance with claim 1 wherein a current-limiting resistor is connected between the cathode of the silicon controlled rectifier and the negative output terminal of the generator.

3. A circuit for cutting off the charging current to a battery from a direct-current generator having a shunt field winding and capable of being driven at widely varying speeds to develop a correspondingly varying output voltage, said battery including at least one secondary cell connected across the output terminals of said generator and the shunt field winding through a rectifier poled to permit charging the battery when the voltage across the generator exceeds the battery voltage, said circuit comprising a controlled rectifier connected across said shunt winding and having a control electrode, a voltage divider connected across said battery, said voltage divider having an intermediate point, said intermediate point being connected to said control electrode, said circuit being so arranged that said controlled rectifier is rendered conductive when the voltage across said battery has reached a predetermined value, thereby to short-circuit said shunt winding by the conductive controlled rectifier, said voltage divider including two Zener diodes and a resistor connected in series, said intermediate point being the junction between said resistor and one of said Zener diodes, and a capacitor connected across said resistor and one of said Zener diodes.

References Cited
UNITED STATES PATENTS

| | | | |
|---|---|---|---|
| 3,009,091 | 11/1961 | Hallidy | 322—23 X |
| 3,032,701 | 5/1962 | Krausz | 322—25 |
| 3,141,124 | 7/1964 | Atherton | 320—1 |
| 3,159,755 | 12/1964 | Duncan | 307—885 X |
| 3,173,077 | 3/1965 | Kirk et al. | 322—73 |
| 3,209,237 | 9/1965 | Wiest | 323—22 |
| 3,260,917 | 7/1966 | Shimwell et al. | 320—39 X |
| 3,217,229 | 11/1965 | Ballard | 320—68 |

JOHN F. COUCH, *Primary Examiner.*

STANLEY WEINBERG, *Assistant Examiner.*

U.S. Cl. X.R.

320—39, 64; 322—68